United States Patent Office 3,613,344
Patented Oct. 19, 1971

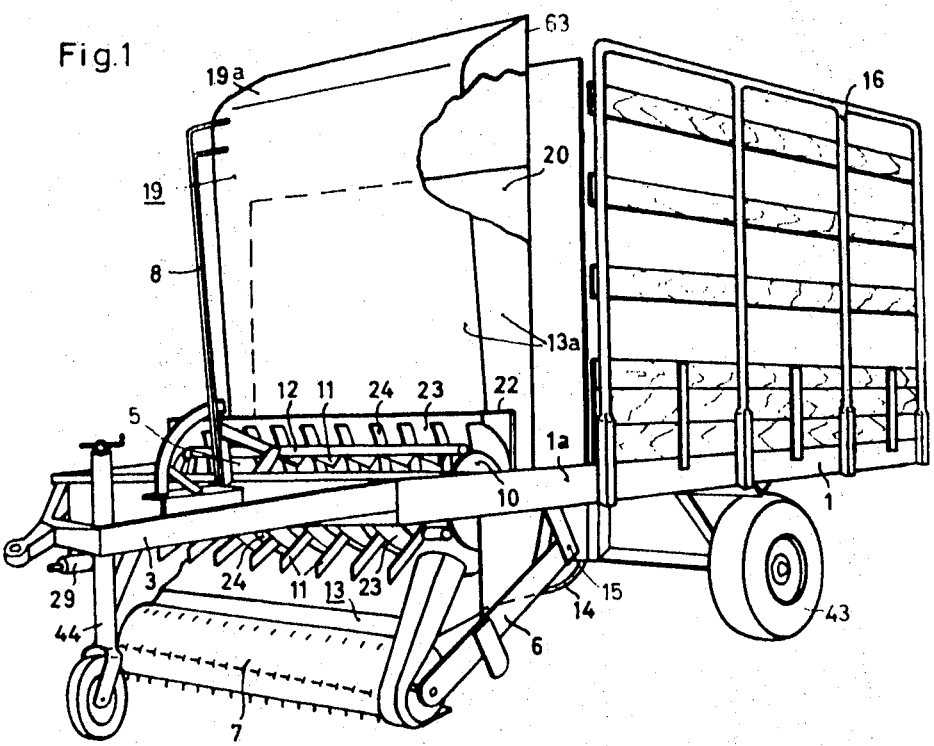
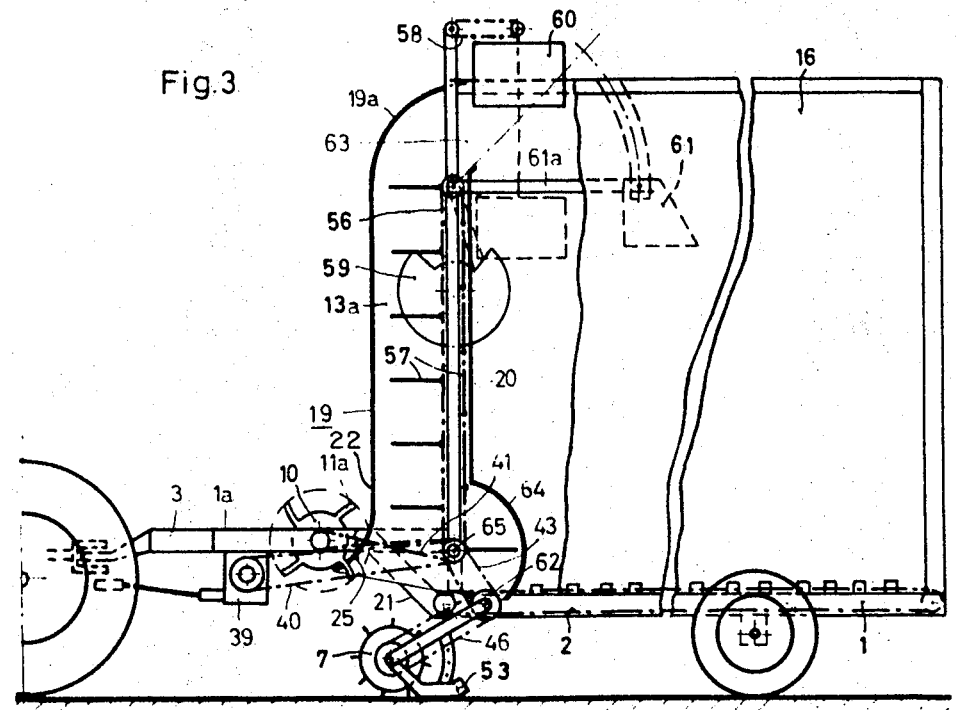

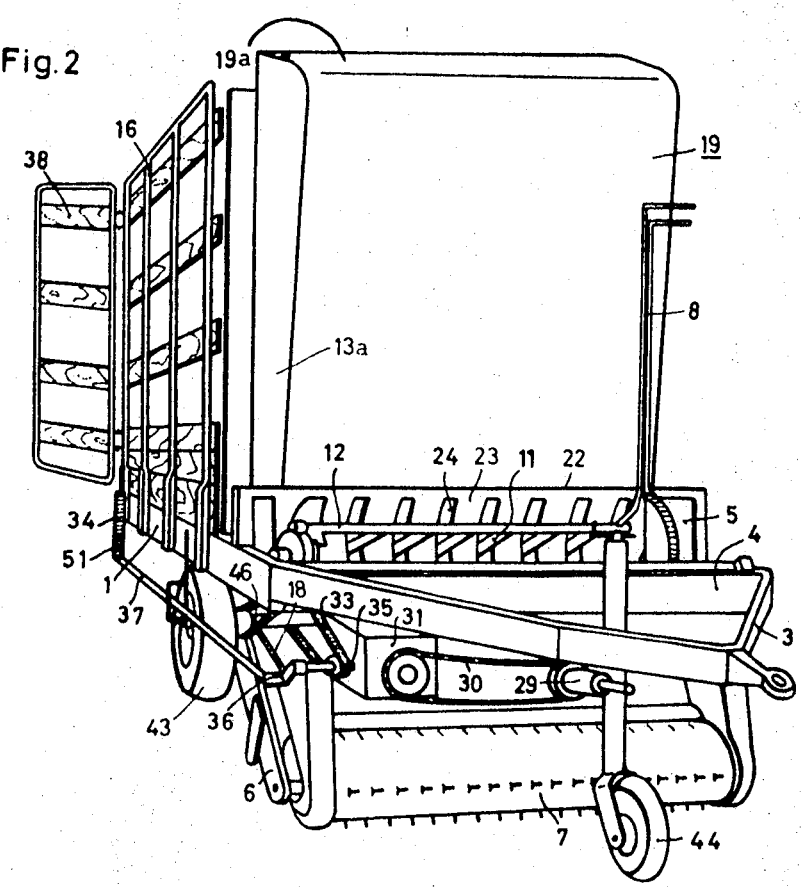

3,613,344
SELF-LOADING VEHICLE FOR AGRICULTURAL BULK MATERIALS
Ernst Weichel, 1 Bahnhofstrasse, 7326 Heiningen, Germany
Continuation-in-part of application Ser. No. 115,208, June 6, 1961. This application Oct. 22, 1965, Ser. No. 501,108
Int. Cl. A01d *43/06*
U.S. Cl. 56—364                      13 Claims

ABSTRACT OF THE DISCLOSURE

A self-loading vehicle for loading, transporting and unloading bulk agricultural materials, particularly in the form of blades, stalks and the like, including a receiving device and a cooperating conveyor arrangement including a closed duct extending upwardly at a relatively steep slope, which duct rises to a level above that of the loading space and is curved at its outlet portion so that material being conveyed through the duct is discharged therefrom in a substantially horizontal direction toward the loading space.

---

This invention—which is a continuation in part of my copending application Ser. No. 115,208 of June 6, 1961, issued on May 24, 1966, as U.S. Pat. No. 3,252,277—relates to a self-loading vehicle for agricultural bulk materials, such as hay, green fodder, straw, etc.

There are known agricultural self-loading vehicles in which the loading area is provided with a scraper floor, by which the goods conveyed by means of, e.g., an inclined conveyor to the upper end of the superstructure of the vehicle and emerging therefrom into the loading space are distributed horizontally. Yet due to the great overall length of the inclined conveyor, the proportion between the overall length of the vehicle and the available loading space in such a vehicle is unfavorable. What is more, the open inclined conveyor does not permit pre-compression of the goods to be loaded.

In contradistinction therefrom, the self-loading vehicle embodying the present invention and comprising a receiver element as well as adjoining conveyor means permitting the goods to emerge near the upper end of the superstructure in a loading space and to fall onto a loading area provided with a scraper floor is characterized in that the conveyor arrangement includes a closed duct which is steeply extending upwardly at least above the loading area, and the rear wall of which is adjacent the end face of the loading space, while the front wall thereof with its upper part runs backward at an arc and terminates in spaced apart relation above the rear wall of the duct and defines a passage opening therewith, which is directed toward the loading space and serves for passage of the conveyed goods therethrough.

The transport of the received goods through the steep upwardly extending duct can be effected in various ways by known per se conveyor means. Thus, e.g., a conveyor chain studded with preferably tiltable prongs is arranged in the conveyor duct.

Instead thereof, or additionally thereto, is provided a conveyor element which engages the goods and is arranged at the entrance of the conveyor duct opposite the receiver element which comprises a pick-up drum. The push exerted by the conveyor element conjointly with the pick-up drum on the goods to be conveyed is sufficient to raise the goods contained in the conveyor duct up to the level of the exit opening under the pushing action of the subsequent goods.

Two exemplary embodiments of the invention will be elucidated hereinafter with reference to the accompanying drawing, in which:

FIGS. 1 and 2 are a view of a self-loading vehicle according to the invention as seen at an angle from the left and from the front, respectively; and FIG. 3 is another diagrammatic, partly sectional view of a further example of the self-loading vehicle.

In the exemplary embodiment shown in FIGS. 1 and 2, the chassis 1 of a single axle trailer having a roller- or scraper-floor 2 (see FIG. 3) is extended in front in such a manner that between the extensions 1a, whereon a draw means 3 is secured, and a traverse 4 and the scraper floor constituting the loading area a recess 5 is formed for the accommodation of a loading device. The same comprises a pick-up drum 7 which is mounted—so as to be adjustable in height by means of a hand lever 8—on cantilever support arms 6 pivoted about an axis 15, and a conveyor drum 10 which is journalled on the extensions 1a and has a plurality of rakes 12 mounted pivotally as shown, for example, in FIG. 12 of the aforementioned U.S. Pat. No. 3,252,277, which rakes are studded with conveyor elements 11, the direction of rotation of which is opposite the direction of the pick-up drum 7. The conveyor elements 11 move in and out of a conveyor duct 31, the bottom 14 of which substantially forms a circle concentrical to the axis of the conveyor drum 10 and is continued upwardly in a transverse wall 20 forming the rear wall of the upper steep, upwardly extending part 13a of the conveyor duct and simultaneously the end wall of the loading space 16. The front wall 19 of the duct part 13a with its upper part runs at 19a backward at an arc over the transverse wall 20 which is of lower height and, with the upper edge thereof, defines a rearwardly directed opening 63. The front wall 19 at its lower part is continued at 22 by a grate 23 which has slots 24 matching the conveyor elements 11 and which substantially concentrically surrounds the conveyor drum 10 and is fixed to the traverse 4. Since the conveyor elements 11 protrude only through the slots 24 in the grate 23 into the conveyor 13, any coiling of the material conveyed about the conveyor drum 10 is prevented. The conveyor duct 13, 13a may be formed, for example, of closed sheet metal walls.

The pivotally mounted rakes 12 of the conveyor drum 10 are controlled by means of follow-up rollers and cams, in the manner illustrated in FIGS. 11 and 12 of the aforementioned U.S. Pat. No. 3,252,277, so that the conveyor elements 12 stand perpendicular to the conveyor duct 13 while passing therethrough and are withdrawn from the fodder or the duct 13, respectively, in the direction of driving the vehicle, substantially at the level of the loading area thereof. The conveyor drum 10 is driven by means of a chain 33 from a gear box 31, while the drive of the pick-up drum 7 is derived from the conveyor drum 10 via a chain 46 and belt 18 associated with an intermediate driving wheel mounted on the pivot axis 15. The gear 31 is driven from the tractor by means of a cardan shaft through the connector shaft 29 and an intermediate gear 30. The advance of the roller- or scraper-floor is effected by a known step-by-step drive 34, the pusher pawl 51 of which is moved at a variable stroke by a pull rod 37 which is articulated to an eccentric 36 keyed to the shaft 35 of the gear box. The advance of the roller- or scraper-floor is accordingly steplessly controllable and may be rendered operative conjointly with the pick-up and conveyor drums or separately.

The rear wall 38 of the loading space 16 is hinged. The trailer has two wheels 43 and a supporting wheel 44 adjustable in height.

Manner of operation: a draw means pulls the attached self-loading vehicle over the goods to be loaded, which are lying mostly in swaths on the field and which are engaged by the pick-up drum 7 and conveyed into the conveyor duct 13. There they are taken over by the conveyor elements 11 of the conveyor drum 10 and brought in the conveyor duct substantially to the level of the loading area where the conveyor elements 11 are withdrawn from the conveyor duct 13. The further transport upward in the duct part 13a takes place by the pushing action of the subsequent goods until the goods fall from the passage opening 63 onto the loading area provided with the roller- or scraper-floor 2. In the conveyor duct there takes place a slight to medium pre-compression of the goods depending upon the cross-section of the duct and the amount of goods to be conveyed which is received per time unit. The roller- or scraper-floor transports the goods depending upon the desired loading height either continuously or at certain time intervals in the direction towards the rear end of the loading area until the goods are dammed up at the rear wall 38 of the superstructure 16. When the roller- or scraper-floor remains in operation subsequently, it must run under the goods conveyed, so that a certain compression is effected.

After the filling of the loading space the pick-up drum 7 is raised by means of the hand lever 8, the power take-off shaft of the tractor is disengaged, and the vehicle is driven to the unloading place without any further readjustment. There the hinged rear wall 38 of the loading space 16 is opened, and the load is deposited in a few minutes by rendering the roller- or scraper-floor operative.

FIG. 3 shows a modified exemplary embodiment of the invention. There the lateral beams of the frame 1 are not extended in a straight line, but are upwardly offset over bends 21 for forming a deep-loader and extended so that between the extensions 1a, a (not shown) traverse carrying the drive means 3, and the loading area there is again formed a recess for accommodation of the loading and conveying means. The latter is supported on the soil by means of, e.g., a slider shoe 53 or by supporting wheels and can be raised into the driving position in the manner shown in the first exemplary embodiment.

The conveyor drum 10 mounted opposite the pick-up drum 7 on the frame and rotating in a direction opposite of that of the pick-up drum 7 is provided in this exemplary embodiment with fixed conveyor elements 11a bent opposite the direction of their movement. They protrude through slots in an arcuated grate 25 which is the downward continuation of the end wall 19 of a vertically upwardly extending conveyor duct 13a. Thanks to the grate curvature which is eccentrically arranged with respect to the conveyor drum, the conveyor elements immerse in the goods to be conveyed only during a part of their rotation and they are separated automatically from the goods to be conveyed when emerging from the slots of the grate.

In the conveyor duct 13a in the represented exemplary embodiment there runs a conveyor chain 56 having prongs 57. The drive in this embodiment is carried out through a sturdy worm gearing 39 which is connected to the power take-off shaft of the tractor and which directly drives the drive shaft 65 of the chain 56 through a belt or a chain 40. The drives of the pick-up drum 7 and of the conveyor drum 10 are derived therefrom so that the conveyor drum 10 is driven through a crossed belt 41, while the drive of the pick-up drum 7 takes place through the belts or chains 43 and 46 via an intermediate wheel 62 mounted on the pivot point of the pick-up drum. Thus, the conveyor drum 10 rotates in the reversed sense of the pick-up drum 7, and the path of movement of the conveyor prongs extends partly ahead of that of the prongs of the pick-up drum. In consequence, the conveyor prongs and pick-up prongs engage the goods in the manner of tongs and pull them conjointly into the conveyor duct 13a. Thereupon, the goods in the conveyor duct 13a are pushed upwardly by the prongs 57 until they are deflected backwards by the arcuated upper part 19a of the front wall 19 and fall through the passage opening 63 onto the roller- or scraper-floor 2.

The conveyor chain 56 is preferably provided with tiltable prongs 57. This permits saving space for the return channel of the chain. Thus, the rear wall 20 of the conveyor duct is identical to the end face of the loading space exactly as in the first exemplary embodiment. The same has an arcuated bulge 64 which is provided within the range of the lower shaft 65 for the conveyor chain and in which the conveyor prongs 57 can erect themselves prior to entering the conveyor duct 13a.

At the exit 63 of the conveyor duct there may be additionally provided a presser appliance, for which FIG. 3 shows two exemplary embodiments indicated by broken lines. The same can consist of a weight 60 which is moved up and down continually or as required by means of a cable winch 58. Instead thereof, there can also be used a presser 61 mounted on a pivot arm 61a and actuated by a rotating control cam 59 so that even the uppermost layers of the load can be compressed.

What is claimed is:

1. A self-loading vehicle for loading, transporting and unloading of blades, stalks and similar materials, comprising a chassis frame, a generally-horizontal load surface supported by said frame, a superstructure including walls extending in a generally vertical direction and surrounding said load surface, loading conveyor means, including a substantially closed duct having rigid walls extending in a generally vertical direction to a height at least above said load surface and conveyor chain means with a plurality of prongs secured thereto arranged movably within said conveyor duct, said conveyor duct including a rear wall positioned adjacent to one of said walls of said superstructure, and a front wall curved, in the upper portion thereof, in the direction of said rear wall, the upper end of said front wall being spaced approximately vertically above the upper end of said rear wall, thus defining a passage opening directed rearwardly, which opening serves for passage of materials conveyed through said duct.

2. A self-loading vehicle according to claim 1, wherein the prongs are tiltable.

3. A self-loading vehicle according to claim 2, further comprising upper and lower shafts disposed within the upper and lower portions, respectively, of said conveyor duct and supporting said conveyor chain means, said one wall of said superstructure having a lower portion arcuately-shaped to accommodate erection of said tiltable prongs to entering the conveyor duct in the region of said lower shaft.

4. A self-loading vehicle according to claim 1, further comprising pressing means arranged near said passage opening of the conveyor duct.

5. A self-loading vehicle according to claim 1, wherein the conveyor means is secured to two forwardly extending lateral beams of said frame.

6. A self-loading vehicle according to claim 1, further comprising a driven scraper conveyor on said load surface.

7. A self-loading vehicle according to claim 1, further comprising a pick-up drum disposed in front of the opening at the lower end of said conveyor duct and a conveyor drum disposed within the region of the opening at the lower end of said conveyor duct.

8. A self-loading vehicle according to claim 7, wherein the lower portion of said front wall of said conveyor duct is arcuated to accommodate said conveyor drum, said arcuated portion of said wall including slots therein, said conveyor drum including conveyor elements secured thereto, said elements being positioned so as to protrude through said slots.

9. A self-loading vehicle according to claim 8, wherein the conveyor members are bent opposite the direction of rotation of said conveyor drum.

10. A self-loading vehicle according to claim 8, wherein the axis of rotation of the conveyor drum as seen in the direction of driving is arranged in front of the axis of rotation of the pick-up drum.

11. A self-loading vehicle according to claim 8, wherein the drive of the pick-up and conveyor drums is derived from the drive of the conveyor chain.

12. A self-loading vehicle according to claim 11, further comprising support arms, articulated at said chassis frame about a horizontal pivot axis, and an intermediate driving wheel mounted on said pivot axis, said pick-up drum being mounted between said support arms.

13. A self-loading vehicle according to claim 8, further comprising attachment means at the front end of the vehicle, wherein said load surface is at a lower level than said attachment means, and wherein the conveyor drum and its drive elements are mounted on an upwardly-bent extension of the frame.

References Cited
UNITED STATES PATENTS

| | | | |
|---|---|---|---|
| 1,166,897 | 1/1916 | Geiger | 56—345 UX |
| 1,919,896 | 7/1933 | MacGregor | 56—364 |
| 1,923,405 | 8/1933 | Wickersham | 56—364 |
| 2,641,097 | 6/1953 | Mast | 56—364 UX |
| 2,795,100 | 6/1957 | Sund | 56—345 X |
| 3,252,277 | 5/1966 | Weichel | 56—345 |

ANTONIO F. GUIDA, Primary Examiner